(12) United States Patent
Friedrich

(10) Patent No.: US 10,104,328 B2
(45) Date of Patent: *Oct. 16, 2018

(54) METHODS AND SYSTEMS FOR IGNORING UNINTENTIONAL KEY PRESSES

(71) Applicant: DISH Technologies L.L.C., Englewood, CO (US)

(72) Inventor: Alisson Friedrich, Marietta, GA (US)

(73) Assignee: DISH Technologies L.L.C., Englewood ( * ) Notice: Subject to any disclaimer, the term of this patent is extended or adjusted under 35 U.S.C. 154(b) by 0 days.

This patent is subject to a terminal disclaimer.

(21) Appl. No.: 15/404,078

(22) Filed: Jan. 11, 2017

(65) Prior Publication Data

US 2017/0127009 A1 May 4, 2017

Related U.S. Application Data

(63) Continuation of application No. 14/162,506, filed on Jan. 23, 2014, now Pat. No. 9,578,270.

(51) Int. Cl.
*H04N 5/44* (2011.01)
*H04N 21/422* (2011.01)

(52) U.S. Cl.
CPC ..... *H04N 5/4403* (2013.01); *H04N 21/42215* (2013.01); *H04N 21/42222* (2013.01); *H04N 2005/4421* (2013.01); *H04N 2005/4444* (2013.01)

(58) Field of Classification Search
CPC ... H04N 2005/4417; H04N 2005/4444; H04N 5/4403
USPC ..... 348/734, 14.05, 14.04, 114, 211.99, 552; 340/426.13, 5.61; 345/169
See application file for complete search history.

(56) References Cited

U.S. PATENT DOCUMENTS

| | | | |
|---|---|---|---|
| 8,670,078 B2* | 3/2014 | Waites | G08C 17/02 340/12.54 |
| 9,578,270 B2 | 2/2017 | Friedrich | |
| 2005/0083173 A1* | 4/2005 | Konupek | G08C 23/04 340/5.61 |
| 2009/0140059 A1* | 6/2009 | Barton | F24F 11/0012 236/51 |
| 2013/0147602 A1* | 6/2013 | Toebes | H04N 21/4415 340/5.82 |

OTHER PUBLICATIONS

U.S. Appl. No. 14/162,506 Non-Final Rejection dated Jan. 4, 2016, all pages.
U.S. Appl. No. 14/162,506 Final Rejection dated Jul. 5, 2016, all pages.
U.S. Appl. No. 14/162,506 Notice of Allowance dated Oct. 26, 2016, all pages.

* cited by examiner

*Primary Examiner* — Michael Teitelbaum
*Assistant Examiner* — Jean W Desir
(74) *Attorney, Agent, or Firm* — Kilpatrick Townsend & Stockton

(57) ABSTRACT

Various arrangements are described for ignoring inadvertent remote control key presses. A remote control may detect a first key press, the first key press being linked with a first command. The remote control may measure an orientation of the remote control with respect to a direction of gravity. The remote control may compare the measured orientation of the remote control with threshold orientation angles. The first command may be ignored based on comparing the measured orientation of the remote control with the threshold orientation angles.

17 Claims, 7 Drawing Sheets

METHODS AND SYSTEMS FOR IGNORING UNINTENTIONAL KEY PRESSES

CROSS-REFERENCE TO RELATED APPLICATIONS

This application is a continuation of U.S. application Ser. No. 14/162,506, filed Jan. 23, 2014, the disclosure of which is incorporated by reference herein in its entirety.

BACKGROUND

Remote controls to operate audiovisual equipment, such as television receivers, have become an indispensable part of everyday life. When in the hands of a seasoned user, a remote control can be deftly wielded to change channels and invoke a litany of other functions. When buttons of a remote control are inadvertently activated, however, a remote control can negatively affect a user's use and enjoyment of the audiovisual equipment. For example, buttons of a remote control misplaced between couch cushions can be accidentally depressed and trigger a channel change while a user is trying to watch television programming.

SUMMARY

In some embodiments, a method for ignoring inadvertent remote control key presses is presented. The method may include detecting, by a remote control, a first key press and a second key press. The first key press may be associated with a first command to be transmitted to a television receiver and the second key press may be associated with a second command to be transmitted to the television receiver. The method may include determining whether the first key press and the second key press have occurred within a first predefined threshold time period. The method may include ignoring the first command and the second command based on determining whether the first key press and the second key press occurred within the first predefined threshold time period.

Embodiments of such a method may include one or more of the following features: The method may include determining whether the first key press and the second key press have occurred within the first predefined threshold time period is performed by the remote control. Ignoring the first command and the second command based on determining whether the first key press and the second key press occurred within the first predefined threshold time period may include the remote control not transmitting either the first command or the second command to the television receiver. Determining whether the first key press and the second key press occurred within the first predefined threshold time period may be performed by the television receiver. Ignoring the first command and the second command based on determining whether the first key press and the second key press occurred within the first predefined threshold time period may include the television receiver not performing a function associated with either the first command or the second command. The method may include determining, by the television receiver, whether the first key press and the second key press correspond to a predefined unexpected key combination of a stored plurality of unexpected key combinations. Ignoring the first command and the second command is further based on determining whether the first key press and the second key press may correspond to the predefined unexpected key combination. The method may include storing, by the television receiver, an indication of a plurality of key combinations. The method may include determining, by the television receiver, the first key press and the second key press do not correspond to a key combination of the plurality of key combinations. Ignoring the first command and the second command may be further based on determining the first key press and the second key press do not correspond to the key combination of the plurality of key combinations.

Additionally or alternatively, embodiments of such a method may include one or more of the following features: The method may include determining that a second predefined threshold time period has elapsed since a previous key press on the remote control. The method may include, in response to the second predefined threshold time period elapsing, entering the remote control into an ignore mode. The ignore mode may cause the remote control to ignore key presses provided via a first subset of keys of the remote control. Exit from the ignore mode may be based on one or more key presses of a key in a second subset of keys of the remote control. Ignoring the first command and the second command may be further based on the remote control being in the ignore mode and the first key press and the second key press corresponding to keys within the first subset of keys of the remote control. The method may include receiving, by the television receiver, user input requesting a first subset of keys of the remote control be disabled. Ignoring the first command and the second command may be further based on the first key press and the second key press corresponding to keys within the first subset of keys of the remote control. The method may include measuring, by the remote control, a first biometric measurement associated with the first key press. The method may include measuring, by the remote control, a second biometric measurement associated with the second key press. The method may include assessing, by the remote control, that the first biometric measurement associated with the first key press and the second biometric measurement associated with the second key press do not correspond to intentional user input. Ignoring the first command and the second command may be further based on assessing that the first key press and the second key press do not correspond to intentional user input. The method may include determining, by the remote control, that the remote control is pointed more than a threshold angle away from a remote control antenna of the television receiver. Ignoring the first command and the second command may be further based on determining that the remote control is pointed more than the threshold angle away from the remote control antenna of the television receiver. The method may include measuring, by the remote control, an orientation of the remote control with respect to a direction of gravity. The method may include comparing, by the remote control, the measured orientation of the remote control with threshold orientation angles. Ignoring the first command and the second command may be further based on comparing the measured orientation of the remote control with the threshold orientation angles.

In some embodiments, a system for ignoring inadvertent remote control key presses may be presented. The system may include a remote control configured to detect a first key press and a second key press. The first key press may be associated with a first command to be transmitted to a television receiver and the second key press may be associated with a second command to be transmitted to the television receiver. The system may include one or more processors (which could be part of the remote control or part of a television receiver). The system could include a memory communicatively coupled with and readable by the one or more processors and having stored therein processor-readable instructions. The instructions, when executed by the one or more processors, cause the one or more processors to determine whether the first key press and the second key press have occurred within a first predefined threshold time period. The instructions may cause the one or more processors to ignore the first command and the second command based on determining whether the first key press and the second key press occurred within the first predefined threshold time period.

Such a system may include one or more of the following features: The instructions may cause the one or more processors to determine whether the first key press and the second key press correspond to a predefined unexpected key combination of a stored plurality of unexpected key combinations. The processor-readable instructions that, when executed, cause the one or more processors to ignore the first command and the second command may be further based on determining whether the first key press and the second key press correspond to the predefined unexpected key combination. The instructions may cause the one or more processors to store an indication of a plurality of key combinations. The instructions may cause the one or more processors to determine the first key press and the second key press do not correspond to a key combination of the plurality of key combinations. The processor-readable instructions that, when executed, cause the one or more processors to ignore the first command and the second command may be further based on determining the first key press and the second key press do not correspond to the key combination of the plurality of key combinations. The remote control may be configured to determine that a second predefined threshold time period has elapsed since a previous key press on the remote control. The remote control may be configured to, in response to the second predefined threshold time period elapsing, enter the remote control into an ignore mode. The ignore mode may cause the remote control to ignore key presses provided via a first subset of keys of the remote control. Exit from the ignore mode may be based on one or more key presses of a key in a second subset of keys of the remote control.

Additionally or alternatively, such a system may include one or more of the following features: The processor-readable instructions, when executed, may further cause the one or more processors to receive user input requesting a first subset of keys of the remote control be disabled. The processor-readable instructions that, when executed, cause the one or more processors to ignore the first command and the second command further may further base the ignoring on the first key press and the second key press corresponding to keys within the first subset of keys of the remote control. The remote control may be configured to measure a first biometric measurement associated with the first key press. The remote control may be configured to measure a second biometric measurement associated with the second key press. The remote control may be configured to assess that the first biometric measurement associated with the first key press and the second biometric measurement associated with the second key press do not correspond to intentional user input. The processor-readable instructions that, when executed, cause the one or more processors to ignore the first command and the second command may be further based on the remote control assessing the first key press and the second key press do not correspond to intentional user input. The remote control may be configured to determine that the remote control is pointed more than a threshold angle away from a remote control antenna of the television receiver. The processor-readable instructions that, when executed, cause the one or more processors to ignore the first command and the second command may further base the ignoring on the remote control being pointed more than the threshold angle away from the remote control antenna of the television receiver. The one or more processors may be on-board the remote control. The remote control may be configured to measure an orientation of the remote control with respect to a direction of gravity. The remote control may be configured to compare the measured orientation of the remote control with threshold orientation angles. The processor-readable instructions that, when executed, cause the one or more processors to ignore the first command and the second command may further base the ignoring on comparing the measured orientation of the remote control with the threshold orientation angles. The one or more processors may be on-board the remote control.

In some embodiments, a non-transitory processor-readable medium for ignoring inadvertent remote control key presses may be presented. The non-transitory processor-readable medium may include processor-readable instructions configured to cause one or more processors to detect a first key press and a second key press. The first key press may be associated with a first command to be transmitted to a television receiver and the second key press may be associated with a second command to be transmitted to the television receiver. The instructions may be further configured to cause the one or more processors to determine whether the first key press and the second key press have occurred within a predefined threshold time period. The instructions may be further configured to cause the one or more processors to ignore the first command and the second command based on determining whether the first key press and the second key press occurred within the predefined threshold time period.

Embodiments of such a non-transitory processor-readable medium may include one or more of the following features: The instructions may be further configured to cause the one or more processors to determine that a second predefined threshold time period has elapsed since a previous key press on a remote control. The instructions may be further configured to cause the one or more processors to, in response to the second predefined threshold time period elapsing, enter the remote control into an ignore mode. The ignore mode may cause the remote control to ignore key presses provided via a first subset of keys of the remote control. Exit from the ignore mode may be based on one or more key presses of a key in a second subset of keys of the remote control. The processor-readable instructions configured to cause the one or more processors to ignore the first command and the second command may be further based on determining that the remote control is in the ignore mode.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

While a conventional remote control may output and conventional television receiver may process commands based on pressed keys (also referred to as buttons) of the remote control without any analysis, embodiments detailed herein assess various characteristics of the key presses and the remote control to determine if the key press was likely intentional or unintentional. Elimination or a decrease in the number of unintentional commands based on unintentional key presses may benefit the viewing experience of one or more users.

As an example, if a remote control has become lodged between couch cushions, a user's shift in body position on the couch may result in an unintentional key press that causes a command to be issued to the television receiver by the remote control. This command may cause some unexpected function to be performed by the television receiver, such as a channel change, a menu to be displayed, the power to be turned off, etc. As another example, when pushing a key on a remote control, a user may inadvertently push a second key. For instance, if the mute button is located next to the power button on the remote control, the user may accidentally push the power button in addition to the mute button. Thus, the television receiver may be inadvertently turned off when the user only intended for the audio of the television receiver to be muted.

Embodiments detailed herein can be used to decrease the number of inadvertent commands issued to a television receiver via a remote control. Embodiments detailed herein may be applied to situations where multiple key presses occur, such as a combination of keys in rapid succession. Embodiments detailed herein may additionally or alternatively be applied to situations where a single key press has occurred. While the embodiments detailed herein are focused on a remote control interacting with a television receiver, it should be understood that other forms of electronic equipment that can be controlled via a remote control may be used in lieu of a television receiver. For instance, other audio/visual equipment (e.g., a receiver, a radio), a fan, a thermostat, a generator, a vehicle (e.g., remote starter, keyless entry) and a garage door are examples of additional types of electronic equipment that can be controlled via a remote control. Further, while the description provided herein is generally directed to various forms of remote controls, it should be understood that the arrangements detailed herein for determining if one or more key presses are unintentional can be applied to other computerized devices with keypads. For instance, method 400 may be applicable to security system consoles that have keypads.

Figure 1:
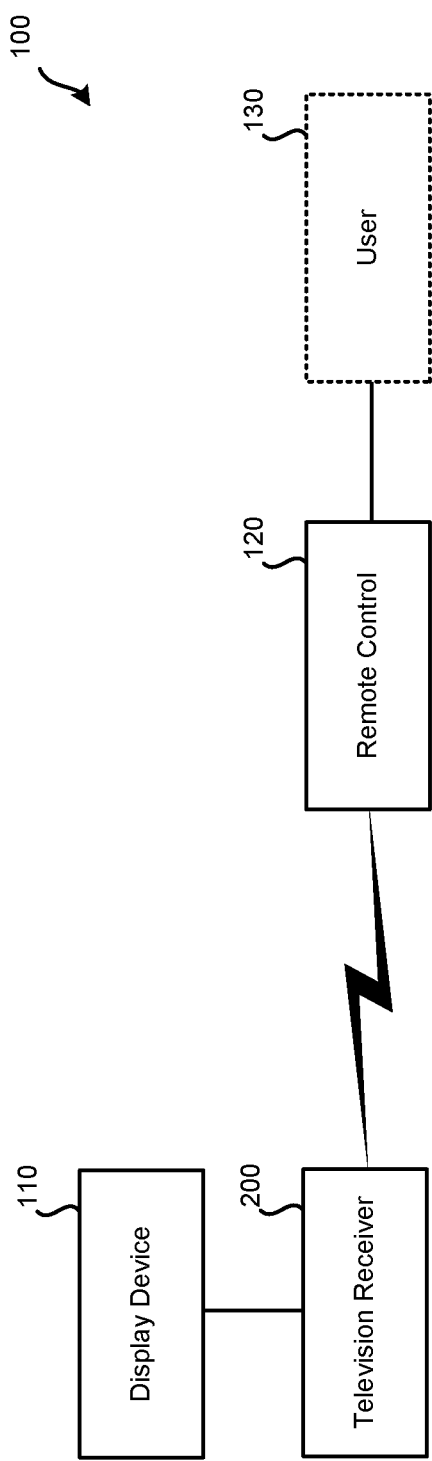
FIG. 1 illustrates an embodiment of a television receiver configured to ignore inadvertent remote control key presses.

FIG. 1 illustrates an embodiment of a television control system 100. Television control system 100 may include: a display device 110, a television receiver 200, and a remote control 120. Remote control 120 may be in wireless communication, such as via RF or infrared, or wired communication with television receiver 200. Remote control 300A may transmit commands to television receiver 200 based on keys pressed on the remote control. Intentional key presses may be made by user 130 on the remote control. Unintentional key presses may be inadvertently made by user 130 (such as while attempting to push another key) or by a key of remote control 300A being pushed against another object (e.g., a couch cushion).

Television receiver 200 may provide audio and/or video to display device 110 for presentation. Display device 110 may be a television, monitor, or some other form of display device. Television receiver 200, remote control 300A, or both may have a command analysis module that is configured to determine if the commands associated with remote control key presses were likely intentional. Television receiver 200 is detailed further with respect to FIG. 2. Remote control 300A is detailed further with respect to FIG. 3A.

Figure 2:
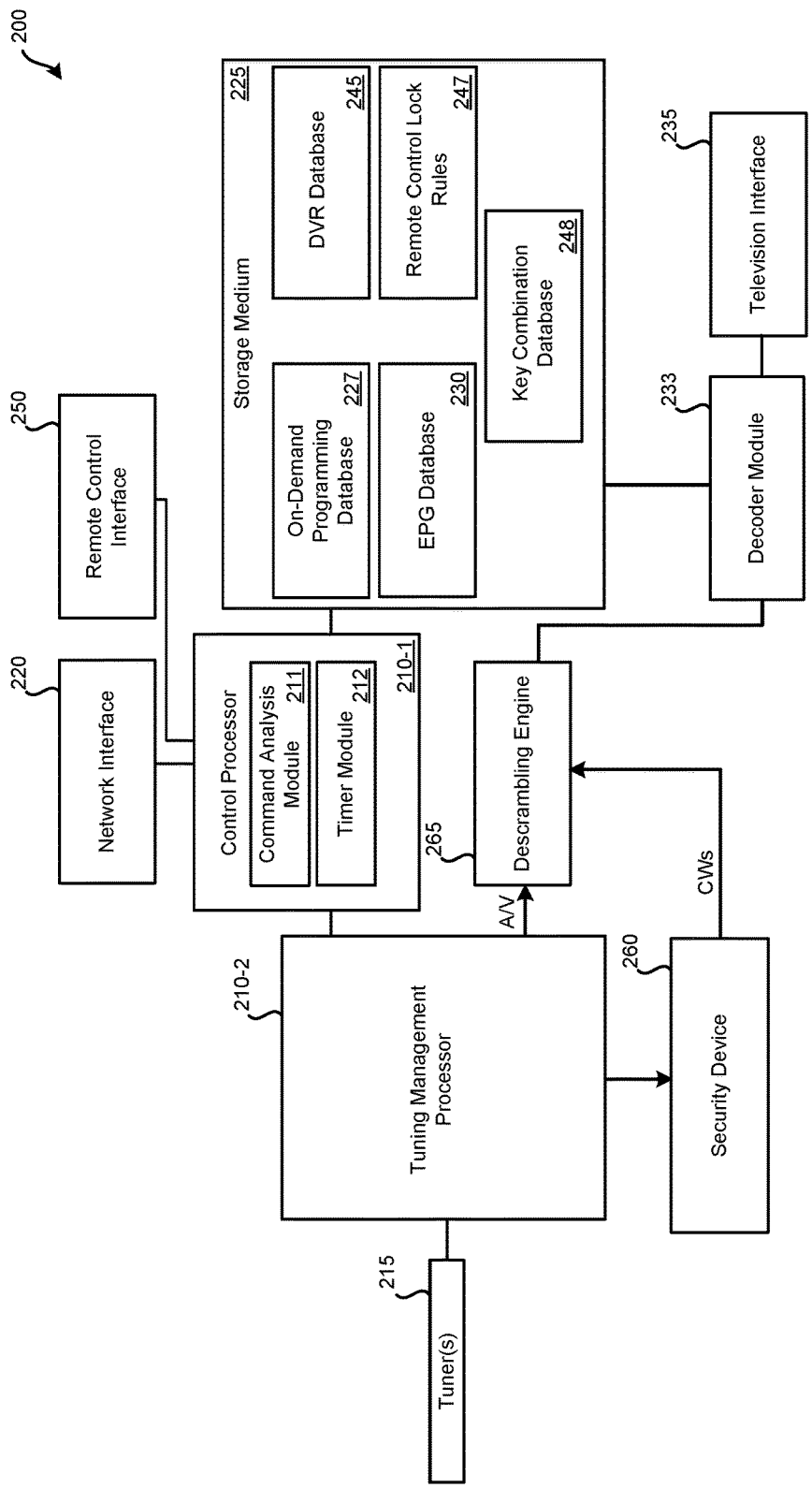
FIG. 2 illustrates an embodiment of a remote control configured to ignore inadvertent remote control key presses.

FIG. 2 illustrates an embodiment of a television receiver 200 configured to ignore inadvertent remote control key presses. Television receiver 200 may perform none, some, or all of the functions related to determining if one or more key presses on a remote control were inadvertent. Television receiver 200 may be in the form of a separate device configured to be connected with a display device, such as a television. Embodiments of television receiver 200 can include set top boxes (STBs). In addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

Television receiver 200 may be incorporated as part of a television, such as display device 110 of FIG. 1. Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, television interface 235, digital video recorder (DVR) database 245 (which may include provider-managed television programming storage and/or user-defined television programming), on-demand programming database 227, remote control interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and remote control interface 250. Control processor 210-1 may handle incoming data from network interface 220 and remote control interface 250. Additionally, control processor 210-1 may be configured to output data via network interface 220.

Control processor 210-1 may include a command analysis module 211. Command analysis module 211 may serve to assess whether one, two, or more than two commands received from a remote control, via remote control interface 250, should be executed or ignored. Command analysis module 211 may access remote control lock rules 247, key combination database 248, and/or may access a timer (such as timer module 212) that determines, for multiple commands, an amount of time that has elapsed between commands. A timer may also be used to determine if a subset of keys of the remote control should be disabled due to a period of time elapsing and the remote control entering an "ignore" mode. Further detail of how command analysis module 211 may use a timer is detailed in relation to method 400 of FIG. 4.

Remote control lock rules 247 may store various rules that have been set by a user that govern use of a remote control. Remote control lock rules 247 may set a period of time after which the remote control is entered into an ignore mode. For example, the period of time may be 10 seconds, 30 seconds, 1 minute, 5 minutes, 20 minutes, or some other shorter or longer period of time. If the period of time elapses with no command being received from the remote control, the ignore mode may be entered. When in the ignore mode, a subset of keys on the remote control may be ignored. That is, pressing any of the subset of keys may result in a command being sent to the television receiver, but the command may be ignored by command analysis module 211. Only a certain subset of keys (e.g., a particular key) or key combination may be accepted by the television receiver by the command analysis module 211 to exit the television receiver from the ignore mode and cause the television receiver to enter a command mode. When in the command mode, commands may be accepted from all keys of a remote control (subject to other rules detailed herein).

In addition to remote control lock rules 247 in combination with command analysis module 211 controlling when the television receiver is in a command mode or an ignore mode, remote control lock rules 247 may be used to disable commands associated with particular keys of the remote control. Disabling one or more particular keys of the remote control may include the television receiver ignoring commands associated with the disabled keys or a message being transmitted to the remote control that indicates commands associated with the disabled keys should not be transmitted to the television receiver when the disabled keys are pressed. Disabling one or more particular keys may be useful if a user does not tend to use the one or more particular keys; however, the user (or some other user) at least occasionally unintentionally presses the one or more particular keys causing and unintended function to occur. In some embodiments, in order to define which one or more keys of the remote control are disabled, television receiver 200 may output, via television interface 235, a graphical representation of the remote control. The user may then be permitted to select which buttons on the remote control are enabled or disabled. For example, the graphical interface provided by television receiver 200 may display keys as green when enabled and as red when disabled. In some embodiments, when the user presses a disabled key, rather than no action occurring, a graphical or textual indication may be output by the television receiver via television interface 235 and displayed to the user. For example, a small indication may be output for display that indicates a disabled key has been pressed. Therefore, if the user is intentionally trying to push the button, the user will be made aware that the key has been disabled. If the user did not intentionally try to push the key, the user will be made aware that the key was accidentally pressed. Whether intentionally or unintentionally pressed, when disabled, the command associated with the key will not be executed by command analysis module 211 (or will not be transmitted by the remote control). Whenever a command is received by command analysis module 211, command analysis module 211 may use remote control lock rules 247 to determine if the command is associated with the disabled key of the remote control. If disabled, a graphical (or audio) indication may be output indicating that the key associated with the command is disabled.

Key combination database 248 may be created in multiple ways. First, the key combination database 248 may store indications of remote control key combinations that are known to likely be unintentional. For example, if the channel up button is in close proximity to the "9" button on the remote control, if these buttons are pressed in rapid succession it may be expected that the user was only intending to push one of the buttons. Various key combinations may be stored to key combination database 248 by the television service provider. These various key combinations may have been identified as likely accidental combinations that might be pushed by a user. Via a television distribution network, such as via satellite or cable, key combination database 248 may be updated by the television service provider to add or remove various key combinations. Additionally or alternatively, a user may be permitted to add or remove various key combinations from key combination database 248. For example, a user may accidentally strike a particular combination of keys frequently. To prevent unintended commands from being issued to the television receiver, the user may add the key combination to key combination database 248 such that the associated commands of the keys are ignored when the unintentional combination occurs. When a key combination is received via remote control interface 250, command analysis module 211 may check the key combination against key combination database 248 to determine if the commands associated with the key combination should be processed or ignored.

Key combination database 248 may also be created based on heuristics. Therefore, if a particular key combination is received by remote control interface 250 and processed by command analysis module 211 but a cancel (or similar) command is received shortly thereafter, it may be determined that the key combination was unintentional. If this key combination is received more than a threshold number of times followed by a cancel command (e.g., once, twice, three times), it may be determined that the key combination is likely unintentional. This key combination may then be added to key combination database 248 as a key combination that should have its associated commands ignored. Conversely, if a key combination present in key combination database 248 is received (e.g., multiple times successively), it may be determined that the key combination was intentionally pressed by the user. Therefore, this particular key combination may be removed from key combination database 248 as a key combination to be ignored. In some embodiments, if a key combination that is to be ignored based on being included in key combination database 248 is received, the commands associated with the key combination may not be executed immediately; however, an indication may be output for presentation by the television receiver via television interface 235 that indicates the key combination has occurred. Within a predefined period of time (e.g., 5 seconds), the user may be able to respond to the displayed indication. A positive response may indicate that the combination was intentional and that the commands associated with the key combination should be performed. As an example of this, if the user pushes the mute button followed rapidly by the power button and this combination is determined by command analysis module 211 to be present in key combination database 248 as a key combination to be ignored, an indication may be output by the television receiver and presented on the display device asking if the user is sure that this combination was intentional. If the user responds in the affirmative, the commands may be performed; if the user responds no or does not respond, the commands may not be performed.

Tuners 215 may include one or more tuners used to tune to transponders that include broadcasts of one or more television channels. In some embodiments, two, three, or more than three tuners may be present, such as four, six, or eight tuners. Each tuner contained in tuners 215 may be capable of receiving and processing a single transponder stream from a satellite transponder (or from a cable network) at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be tuned to. In some embodiments, the key combination database (and/or remote control lock rules 247) are stored and processed by the remote control.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet. Data may be transmitted from television receiver 200 to a television service provider system and from the television service provider system to television receiver 200. Information may be transmitted and/or received via network interface 220. For instance, instructions from a television service provider may also be received via network interface 220, if connected with the Internet.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to EPG database 230, DVR database 245, remote control lock rules 247, key combination database 248, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider (e.g., a cable network). Updates to EPG database 230 may be received periodically. EPG database 230 may serve as an interface for a user to control DVR functions of television receiver 200, and/or to enable viewing and/or recording of multiple television channels simultaneously.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 230 and/or information from EPG database 230) to a television for presentation. Television interface 235 may also serve to output a CVM.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

DVR Database 245 may also store television programming that is recorded based on analysis of one or more users. For instance, if a user frequently watches and/or records sports, a major sporting event may be selected by control processor 210-1 for recording based on a profile associated with the user. The day of the week, channel, and/or time of previously set timers may also be used to record television programming. For instance, if a user has previously set a timer to record television channel five at 8 PM on Thursdays, control processor 210-1 may set a timer for this same day of the week, channel, and time for some point in the future (even though the user has not specifically selected it).

On-demand programming database 227 may store additional television programming. On-demand programming database 227 may include television programming that was not recorded to storage medium 225 via a timer (either user- or provider-defined). Rather, on-demand programming may be programming provided to the television receiver directly for storage by the television receiver and for later presentation to one or more users. On-demand programming may not be user-selected. As such, the television programming stored to on-demand programming database 227 may be the same for each television receiver of a television service provider.

Remote control interface 250 may receive communications from a remote control (physically separate from television receiver 200) that allows a user to interact with television receiver 200. Remote control interface 250 may receive and send received commands to control processor 210-1, which may then process the commands using command analysis module 211. In some embodiments, it may be possible to load some or all preferences to a remote control. As such, the remote control can serve as a backup storage device for the preferences. In such embodiments, the communication link with the remote control via remote control interface 250 is bidirectional.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 200 may use decryption engine 261 of security device 260 to decrypt ECMs. Decryption of an ECM may only be possible if the user has authorization to access the particular television channel associated with the ECM. When an ECM is determined to correspond to a television channel being stored and/or displayed, the ECM may be provided to security device 260 for decryption.

When security device 260 receives an encrypted ECM, security device 260 may decrypt the ECM to obtain some number of control words. In some embodiments, from each ECM received by security device 260, two control words are obtained. In some embodiments, when security device 260 receives an ECM, it compares the ECM to the previously received ECM. If the two ECMs match, the second ECM is not decrypted because the same control words would be obtained. In other embodiments, each ECM received by security device 260 is decrypted; however, if a second ECM matches a first ECM, the outputted control words will match; thus, effectively, the second ECM does not affect the control words output by security device 260. Security device 260 may be permanently part of television receiver 200 or may be configured to be inserted and removed from television receiver 200, such as a smart card, cable card or the like.

Tuning management processor 210-2 may be in communication with tuners 215 and control processor 210-1. Tuning management processor 210-2 may be configured to receive commands from control processor 210-1. Such commands may indicate when to start/stop receiving and/or recording of a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data.

Descrambling engine 265 may use the control words output by security device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by security device 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 600 of FIG. 6.

While the television receiver 200 has been illustrated as a satellite receiver, it is to be appreciated that techniques below may be implemented in other types of television receiving devices, such a cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. Further, as previously detailed, the electronic device that interacts with the remote control may be some other type of device entirely. For example, a receiver may have command analysis module 211.

Figure 3A:
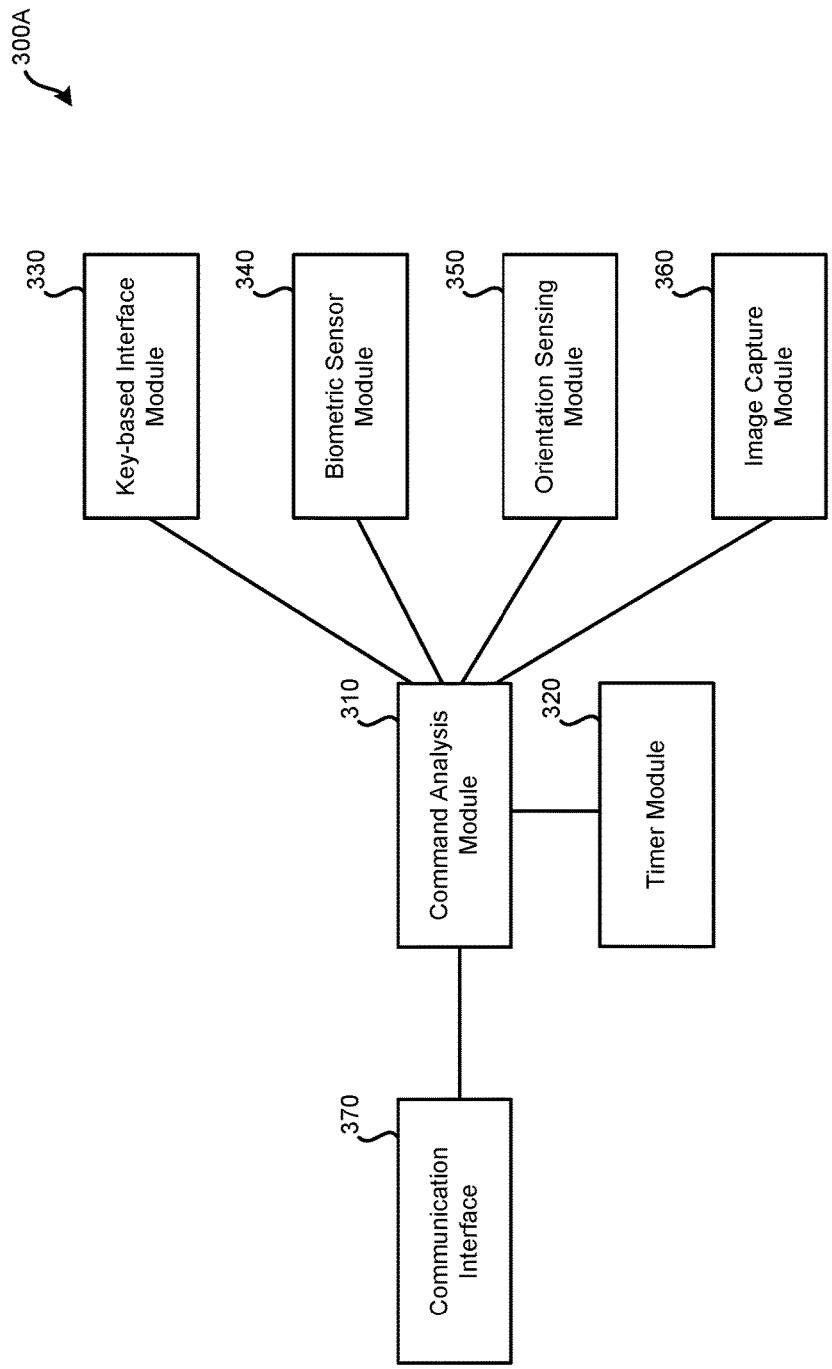
FIG. 3A illustrates an embodiment of a remote control configured for use in ignoring commands associated with inadvertent remote control key presses.

FIG. 3A illustrates an embodiment of a remote control 300A configured for use in ignoring commands associated with inadvertent remote control key presses. Remote control 300A may be configured to communicate with television receiver 200 via remote control interface 250. Remote control interface 250 may include a remote control antenna, as such television receiver 200 may not need to be in the immediate vicinity of remote control 300A. Remote control 300A may include: command analysis module 310, timer module 320, key-based interface module 330, biometric sensor module 340, orientation sensing module 350, image capture module 360, and communication interface 370. It should be understood that various components of remote control 300A may be implemented using hardware, firmware, software, and/or some combination thereof. Functionality of components may be combined or functionality of components may be spread among additional components.

Command analysis module 310 may function similarly to command analysis module 211 of FIG. 2. Therefore, command analysis module 310 may perform the functions previously detailed in relation to command analysis module 211. If one or more commands are determined by command analysis module 310 to be ignored, command analysis module 310 may prevent messages indicating the commands from being transmitted to the television receiver. Therefore, for ignored commands, the television receiver may not receive an indication of the one or more ignored commands. In some embodiments, the commands are transmitted to the television receiver with an indication that the commands should be ignored. In some embodiments, in addition or instead of transmitting commands that are to be ignored, command analysis module 310 may cause an indication of an ignored command to be transmitted to the television receiver. This may cause the television receiver to output an audio or visual indication that one or more commands are being ignored.

In communication with command analysis module 310 may be timer module 320. Timer module 320 may function similarly to timer module 212 of FIG. 2. For instance, timer module 320 may be used to determine if multiple keys have been pressed approximately simultaneously and/or if multiple key presses should be considered to be a key combination. Timer module 320 may also be used to determine if the remote control should be placed in the ignore mode or should be in a command mode based on the remote control being idle for a predefined period of time. Additional details regarding use of timer module 320 are presented in relation to method 400 of FIG. 4.

Key-based interface module 330 may represent a keypad present on the remote control on which the user can press various keys. Therefore, user input is received by command analysis module 310 via key-based interface module 330. Communication interface 370 serves to transmit messages containing commands and/or other data from command analysis module 310 to a television receiver, such as television receiver 200 of FIG. 2. Communication interface 370 may involve the use of an IR transmitter or an RF transmitter. Other forms of transmitters are also possible.

Biometric sensor module 340 may be used to determine if it is likely that the user intended to push a key of key-based interface module 330. Biometric sensor module 340 may include one or more biometric sensors present to sense the user touching the body of the remote control and/or individual buttons. For example, biometric sensor module 340 may include a temperature sensor that can detect in increase in temperature that is likely to correspond to a user holding the remote control and/or pushing a particular button. For example, this increase in temperature is unlikely to be present if the remote control is wedged between couch cushions. However, the temperature increase is likely to be present if the user is holding a remote control in his hand. Biometric sensor module 340 may additionally or alternatively include capacitive touch sensors. These capacitive touch sensors may be configured to determine if indeed a user has pushed a key of key-based interface module 330 and/or if the user's hand is holding the body of remote control 300A. Biometric sensor module 340 may provide input to command analysis module 310 indicating whether or not it is likely that a user is holding remote control 300A and/or has pushed keys of key-based interface module 330. If not, command analysis module 310 may ignore commands associated with key presses of key-based interface module 330. If biometric sensor module 340 indicates the user is holding the remote control and/or user has pushed buttons on the remote control, command analysis module 310 may process the associated commands and cause the commands to be transmitted to the television receiver via communication interface 370.

Orientation sensing module 350 may be configured to determine if the remote control 300A is being held in an orientation (e.g., with respect to gravity) that is indicative of being held by a user. For example, if the body of the remote control is approximately parallel with the ground (e.g., the remote control is pointed at the television receiver), this may be indicative of an orientation of remote control likely being held by a user. However, if the keypad is perpendicular to the ground (e.g., the remote control is pointed at the ceiling) this may be indicative of remote control not being held by the user. Further detail regarding orientation sensing is provided in relation to FIG. 3B. Thresholds for orientation of the remote control may be defined by the television service provider and/or may be defined by the user of remote control 300A. Such thresholds may be stored locally by remote control 300A or by a television receiver with which remote control 300A is communicating. If the remote control is outside of the one or more defined threshold orientations, one or more commands from the remote control may be ignored. Instead, in some embodiments, an indication is presented (e.g., via a display device) to the user indicating why commands are being ignored. Orientation sensing module 350 may provide an indication of the orientation of remote control 300A to command analysis module 310. Command analysis module 310 may compare the orientation of remote control 300A when keys of key-based interface module 330 are pushed with stored thresholds orientations. Alternatively, command analysis module 310 may transmit, via communication interface 270, the orientation of remote control 300A to the television receiver, which may then perform the threshold analysis. Orientation sensing module 350 may include one or more accelerometers, gyroscopes, or other components configured to determine the orientation of remote control 300A.

Image capture module 360 may include one or more image capture devices, such as a camera. Image capture module 360 may be configured to determine if remote control 300A is pointed at the television receiver with which remote control 300A is communicating. Image capture module 360, in combination with command analysis module 310, may be configured to identify television receiver 200 (or a remote control antenna connected with television receiver 200). Command analysis module 310 may be configured to relay commands to the television receiver only if images captured by image capture module 360 indicate remote control 300A is pointed within a threshold angle of the television receiver or television receiver remote antenna. In some embodiments, rather than image capture module 360 being present on remote control 300A, image capture module 360 may be present on the television receiver, which may capture images in which the remote control is identified. From such images captured by the television receiver, it may be possible to determine whether remote control 300A is pointed in the direction (within a threshold angle) of the television receiver. If not, the television receiver may be configured to ignore commands received from remote control 300A.

For simplicity, remote control 300A of FIG. 3A has been reduced to a block diagram; commonly known parts, such as a power supply, have been omitted. Further, some routing between the various modules of remote control 300A has been illustrated. Such illustrations are for exemplary purposes only. The state of two modules not being directly or indirectly connected does not indicate the modules cannot communicate. Rather, connections between modules of the remote control 300A are intended only to indicate possible common data routing. It should be understood that the modules of remote control 300A may be combined into a fewer number of modules or divided into a greater number of modules. Further, the components of remote control 300A may be part of another device, such as built into a television. Remote control 300A may include one or more instances of various computerized components, such as disclosed in relation to computer system 600 of FIG. 6.

Figure 3B:
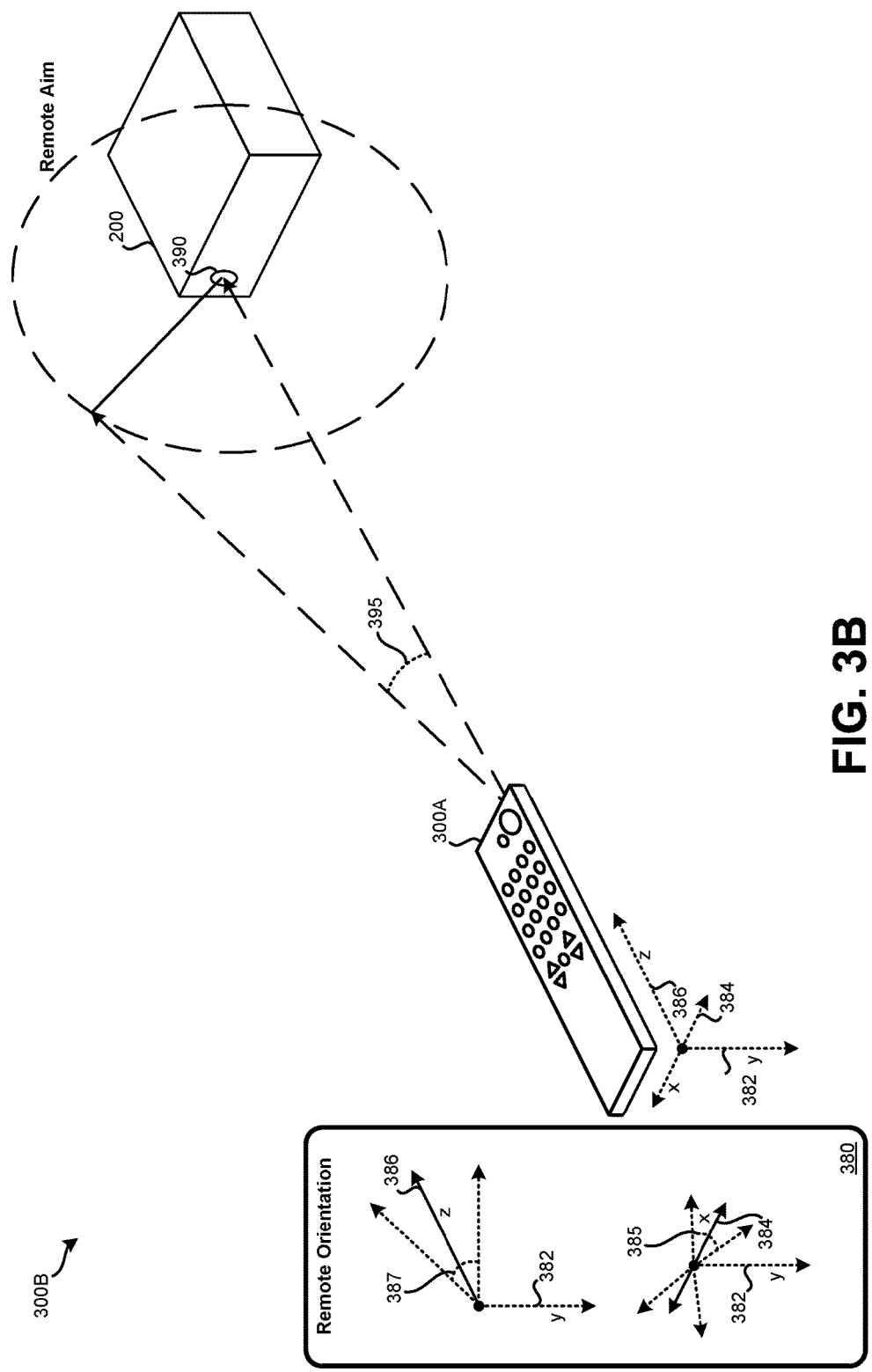
FIG. 3B illustrates an embodiment of a remote control orientation analysis.

FIG. 3B illustrates an embodiment 300B of a remote control orientation and direction analysis. Embodiment 300B represents remote control 300A of FIG. 3A. Embodiment 300B may also represent embodiments of a remote control besides remote control 300A of FIG. 3A. FIG. 3B represents both an orientation and aim analysis of remote control 300A.

Remote orientation 380 illustrates the effect of gravity on remote control 300A. Gravity may be expected to be negative along y-axis 382. By using gravity as a reference, rotation of remote control 300A off x-axis 384 and z-axis 386 can be determined. The z-axis is on a plane that is perpendicular to gravity along y-axis 382. The plane of z-axis 386 can be expected to be parallel to the floor or ground. When a user is holding a remote control, the remote control will likely be approximately on the plane of z-axis 386. Threshold angle 387, which represents a range of positive and negative rotation off the plane of z-axis 386, may be used to determine if the remote control is pointed too high (e.g., towards the ceiling) or too low (e.g., towards the floor) for commands associated with key presses of remote control 300A to be considered valid. Threshold angle 385, which represents a range of positive and negative rotation off the plane of x-axis 384 may be used to determine if the remote control is rotated too far clockwise (e.g., the keys of remote control 300A facing right) or counterclockwise (e.g., the keys of remote control 300A facing left) for commands associated with key presses of remote control 300A to be considered valid. The orientation of remote control 300A being outside of the threshold angles with regard to either the x-axis or z-axis (or both) may be indicative of remote control 300A not being held by a user. The predefined threshold angles may be defined by the television service provider and/or by a user. For instance, if a user typically uses remote control 300A while lying on a couch, the user may not wish for an orientation analysis to be performed for rotation around the z-axis.

Using an image capture module located at either television receiver 200 or remote control 300A, it may be determined whether remote control 300A is aimed within a threshold angle of a target 390 (which may be a remote control antenna, the face of television receiver 200, or a graphical target on television receiver 200). A camera located on remote control 300A may, when a key is pressed on the remote control, locate target 390. If target 390 is within the field-of-view of the camera or a particular portion of the field-of-view of the camera, the command may be determined to be valid; if not, the command may be ignored.

In some embodiments, if remote control 300A uses an IR transmitter to communicate with the television receiver, an IR camera may be used by television receiver 200 to determine where remote control 300A is located and where remote control 300A is facing. A visible-light camera may additionally or alternatively be used by television receiver 200 to locate remote control 300A and determine where remote control 300A is facing. Threshold angle 395 indicates a region permitted for the aim of remote control 300A, within which a command is considered valid. This angle or region may be defined by the television service provider and/or the user. Orientation and aim may be used in combination to determine if the remote control is likely being held by a user and is facing the television receiver. Orientation and aim may also be used separately to determine if the remote control is likely being held by a user or the remote control is facing television receiver 200.

Figure 4:
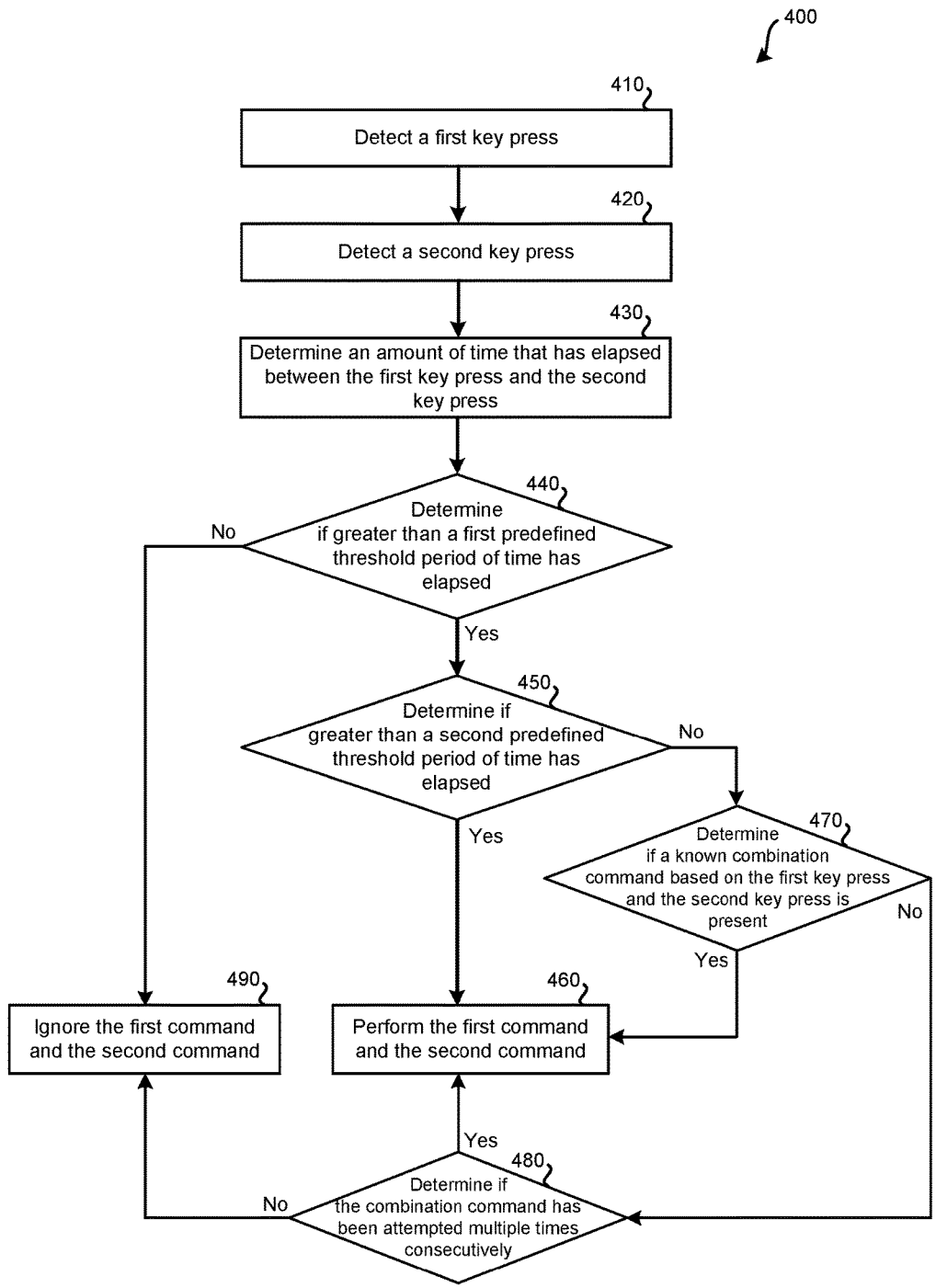
FIG. 4 illustrates an embodiment of a method for ignoring inadvertent remote control key presses.

Various methods can be performed using the devices and system described in relation to FIGS. 1-3B. FIG. 4 illustrates an embodiment of a method 400 for ignoring commands associated with inadvertent remote control key presses. Method 400 is at least partially focused on the timing of multiple key presses by a user. The steps of method 400 may be combined with steps of method 500 of FIG. 5 to determine whether a command based on a remote control key press should be ignored. Method 400 may be performed using television control system 100 of FIG. 1, television receiver 200 of FIG. 2, and remote control 300A. Steps of method 400 may be performed by a television receiver and/or a remote control. For instance, timing functions may be performed by the television receiver and/or the remote control. The various steps of method 400 may be performed using a computerized device which may include instances of components as detailed in relation to computer system 600 of FIG. 6.

At step 410, a first key press may be detected. This key press occurs on the remote control. In some embodiments, a first command associated with the first key press is immediately transmitted to an associated television receiver (without analysis as to whether it was inadvertent). In other embodiments, the command may be delayed by a short period of time, such as a quarter or half second, to determine if another key is also pressed in quick succession. When the first key press is made, a timer may be started or a clock cycle of a clock may be recorded. The timing may be measured by the remote control (when the key was pressed) or at the television receiver (when the command was received from the remote control).

At step 420, a second key press may be detected. This key press also occurs on the remote control. In some embodiments, a second command associated with the second press is immediately transmitted to an associated television receiver (if the same key is pressed, the second command may match the first command). In other embodiments, the command may be delayed by a short period of time, such as a quarter or half second, to determine if the command should be transmitted to the television receiver. The timing may be measured by the remote control (when the key was pressed) or at the television receiver (when the command was received from the remote control).

At step 430, an amount of time that elapsed between the first key press of step 410 and the second key press of step 420 may be determined. If the timing measurement is performed at the television receiver, the amount of time may be indicative of the elapsed time between when the first command and the second command was received. Otherwise, if the timing measurement is performed at the remote control, the measurement may be based on when the keys were pressed.

At step 440, it may be determined if greater than a first predefined threshold period of time elapsed between the key presses of steps 410 and 420. The analysis of step 440 may be performed to determine if the two key presses were substantially simultaneous (e.g., multiple keys being mashed by a finger, multiple keys being almost simultaneously pressed by a couch cushion or by being sat on). If two key presses are within a predefined time of each other (e.g., 0.1 s, 0.2 s, 0.25 s, 0.5 s, etc.), it may be assumed that at least one of the key presses was unintentional. The predefined time period may be defined by the user and/or by the television service provider. For example, the television service provider may define a default value and the user may modify the default value to a time period of the user's selection. The determination of step 440 may only be performed if this analysis is enabled by a television service provider or user. For instance, a user may not desire that commands be ignored if received in a very rapid succession (perhaps the user changes channels very quickly).

If the first predefined period of time has not elapsed between the key presses (or the commands being received), the first command and the second command may be ignored at step 490. If the determination of step 440 was performed by the remote control, ignoring the first command and the second command may include not transmitting the first and second command to the television receiver. If the determination of step 440 was performed by the television receiver, the first command and the second command may be transmitted to and received by the television receiver, but may not be executed (such as by command analysis module 211). Regardless of whether step 490 is performed at the television receiver or at the remote control, both commands may be ignored. In some embodiments, only the second command or only the first command may be ignored. The television service provider and the user may define which successively received command is ignored. Whether the evaluation of the key presses is performed wholly or partly by the remote control or the television receiver, the television receiver, if so configured, may output an auditory indication or visual indication for display that indicated the command(s) associated with the key presses are being ignored, and, possibly, why.

If the first predefined period of time elapsed between the two key presses or two commands being received, method 400 may proceed to step 450 from step 440. At step 450, the amount of time that elapsed between key presses may be compared to a second, longer time period threshold. This time period threshold may be used to determine if the two key presses are likely part of a key combination or are unrelated commands. For instance, if a user pushes button "2," then one second later presses button "7," it may likely be a key combination indicative of the user attempting to change the channel to channel 27. However, if the user pushes "mute," then 30 seconds later presses button "6," the key presses are likely unrelated. If two key presses are within a predefined time of each other (e.g., 0.5 s, 1 s, 2 s, etc.), it may be assumed that a key combination is present. This second predefined time period may be defined by the user and/or by the television service provider. A key combination may not necessarily be indicative of intentional key presses; therefore, rules may be applied to determine if the combination is likely intentional. The determination of step 450 may only be performed if this analysis is enabled by a television service provider or user. For instance, a user may not desire that commands that are part of a key press combination be possibly ignored.

If the second predefined period has elapsed, method 400 may proceed to step 460 from step 450. At step 460, both commands/key presses were determined to be separated by a sufficient amount of time to not be considered simultaneous and by enough time to not be considered part of a key combination. As such, the commands associated with each key press may be executed by the television receiver (and/or transmitted by the remote control) at step 460. In some embodiments, the commands may be evaluated with regard to one or more steps of method 500 of FIG. 5.

If the second predefined period has not elapsed, method 400 may proceed to step 470 from step 450. The first time period elapsing but not the second period of time elapsing may be indicative of a key combination having been pressed. Step 470 may determine if the key combination corresponds to a known key combination. Known key combinations may be stored by the television receiver or the remote control. For example, key combinations may be stored in key combination database 248 of television receiver 200 of FIG. 2. Such a key combination database may alternatively be stored by remote control 300A of FIG. 3A. The known key combinations may be defined (and updated) by the television service provider. The user may also define additional key combinations. For instance, the known key combination database may define valid combinations of numbers (e.g., 2 and 7), and other valid key combinations (e.g., "channel up" then "mute"). If a key combination is determined to be valid at step 470, method 400 may proceed to step 460 and perform the associated commands. The determination of step 470 may only be performed if this analysis is enabled by a television service provider or user. For instance, a user may not desire that commands that are part of a command combination be evaluated against a key combination database.

If it is determined at step 470 (at the remote control or at the television receiver) that the known key combination database does not contain the command combination based on the first and second key presses, the commands may not be performed. For example, "play" followed quickly by "7" may be an unusual combination. If an unknown key combination is performed, method 400 may proceed to step 480 from step 470. Conversely to having a known key database, an "accidental" key combination database may be maintained. This database may store key combinations that are likely to be pressed on by accident. In such embodiments, if such an accidental key combination is pressed, method 400 may proceed to step 480, if not, method 400 may proceed to step 460.

In some embodiments, the key combinations of step 470 are defined by the television service provider and/or by the user. Additionally or alternatively, heuristics can be used to define the known key combinations that are stored by the key combination database and used for evaluation at step 470. If a user presses a key combination a number of times (e.g., once, twice, five times) and, possibly, does not follow the key combination with a cancel command, the key combination may be determined to be desired by the user. This key combination may be added to the key combination database. As an example, if a user presses mute followed by power, this may be an unusual combination. However, if the user does this multiple times over a time period (e.g., a month), it may be made a known key combination based on heuristics. (The user may mute the television receiver before shutting it off so that it starts silently for the next power on.)

If method 400 proceeds to step 480 it may be determined if the user has attempted the key combination multiple times consecutively. For the first number of times (e.g., once, twice), the key combination, because it is unknown, may result in step 490 being performed and the commands being ignored. Since the commands were ignored, the user may repeat the combination if it was actually desired. If the user repeats the key combination, step 480 may be used to determine that the user did intend on performing the key combination. If the unknown key combination has been repeated consecutively (a predefined number of times), method 400 may move to step 460 from step 480. The command combination of step 480 may then be added to the known key combination database. As such, a key combination may be added to known key combination database based on consecutive submission of the key combination and/or the key combination being pressed multiple times nonconsecutively.

Figure 5:
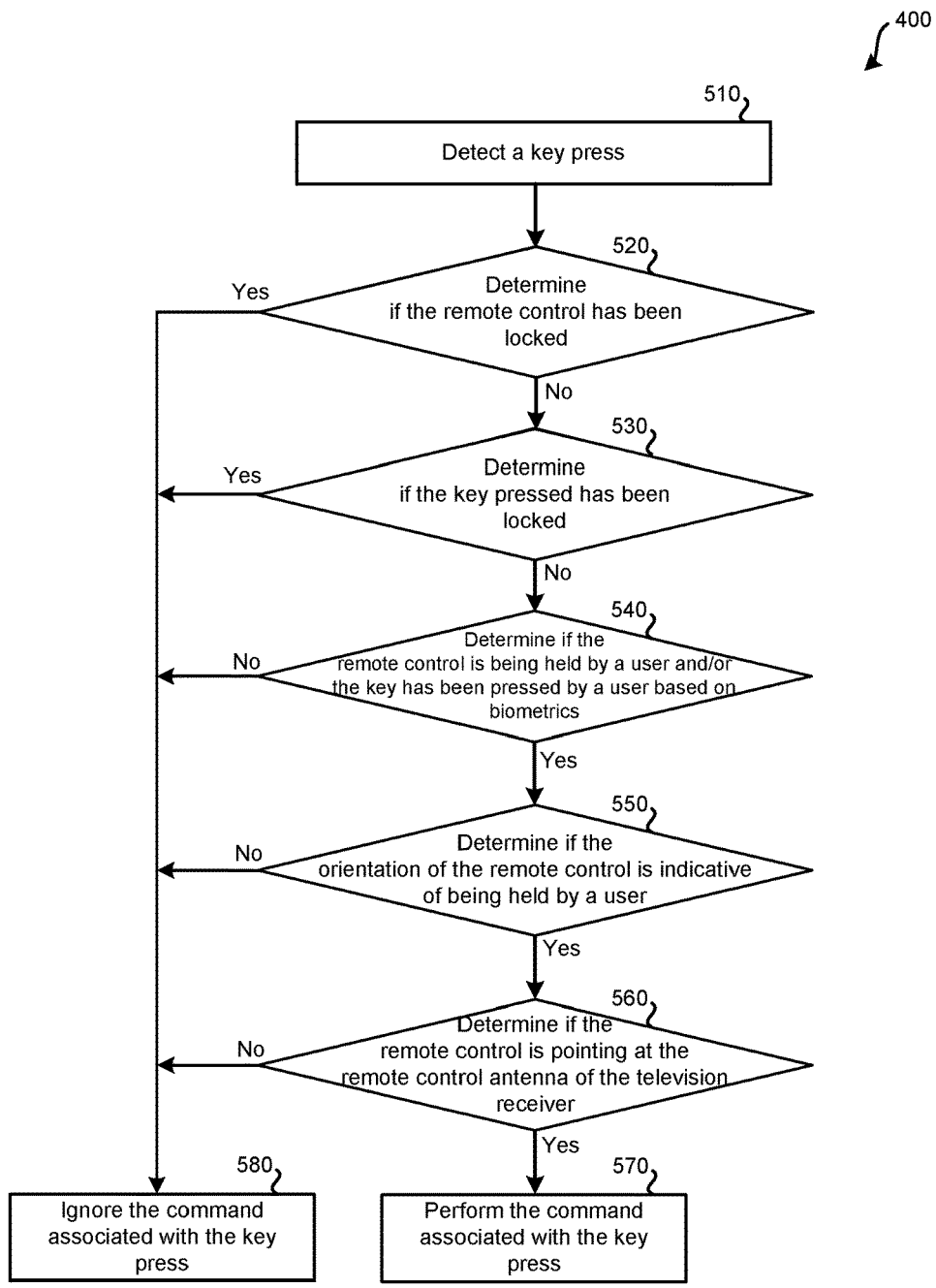
FIG. 5 illustrates another embodiment of a method for ignoring inadvertent remote control key presses.

FIG. 5 illustrates another embodiment of a method for ignoring inadvertent remote control key presses. Method 500 is at least partially focused on individual key presses. As such, the steps of method 500 may be combined with steps of method 400 of FIG. 4 to determine whether one or more commands based on a remote control key press should be ignored. For instance, if according to method 500 a single key press of a key press combination should be ignored, the full key combination may be ignored. Method 500 may be performed using television control system 100 of FIG. 1, television receiver 200 of FIG. 2, and remote control 300A. Steps of method 500 may be performed by a television receiver and/or a remote control. For instance, timing functions may be performed by the television receiver and/or the remote control. The various steps of method 500 may be performed using a computerized device which may include instances of components as detailed in relation to computer system 600 of FIG. 6.

At step 510, a key press may be detected. This key press occurs on the remote control. In some embodiments, a command associated with the key press is transmitted to an associated television receiver and analyzed by the television receiver. In other embodiments, the command may be delayed by a short period of time, such as a tenth of second, to analyze the key press and determine if the associated command should be transmitted to the television receiver.

It should be understood that steps 520-560 may be performed in various orders. Therefore, the illustrated embodiment of method 500 is merely exemplary; other embodiments may include fewer or more steps with such steps arranged in a different order.

At step 520, it may be determined whether at least a subset of keys of the remote control has been locked. Some or all of the keys of a remote control may be locked by the remote control being placed in an ignore mode (instead of a command mode). The ignore mode may be based on a period of time that the remote control has been idle. A television service provider and a user may define this period of time, such as five minutes. The television service provider and the user may also define whether or not the remote control ever enters an ignore mode or remains permanently in a control mode (while the television receiver is powered on). To exit the ignore mode, a second subset of keys (e.g., a particular key) may be required to be pressed or the key desired to be pressed may be required to be held down by the user. The remote control lock state may be determined by the remote control or by the television receiver. If the key pressed by the user at step 510 is locked based on the ignore mode, method 500 may proceed to step 580. Otherwise, method 500 may proceed to step 530.

At step 530, it may be determined if the particular key pressed at step 510 has been disabled. The television service provider and the user may be permitted to disable the commands associated with particular key presses. For instance, if a user has a habit of always pressing the mute button when attempting to push a near-by button, the user may prefer to disable the mute button. As previously described, the user may specify which keys on the remote control are disabled via a GUI containing a representation of the remote control or a listing of buttons output by the television receiver. If step 530 is to be performed by the remote control, an indication of which buttons are disabled may be relayed to the remote control. Otherwise, the remote control may still transmit the command to the television receiver, but the television receiver may ignore the command (e.g., based on remote control lock rules 247). In some embodiments, a key may be partially locked rather than fully disabled. For example, a user can define that a key must be held down for a predefined period of time (e.g., one second) for the command to be sent by the remote control or executed by the television receiver. Such an arrangement may be useful if the user accidentally presses a button frequently but also occasionally presses the button intentionally. The button may also be required to be pressed twice (or more than twice) quickly if locked for the command to be executed. If the key pressed is disabled (or locked and not pressed for a sufficient amount of time or a sufficient number of times), method 500 may proceed to step 580.

At step 540, it may be determined if the remote control is likely being held by a user based on biometrics. This may include the use of a temperature sensor to determine if the body of the remote control is likely situated in a hand of the user (e.g., if the bottom of the body of the remote control is in the user's hand palm). A temperature sensor may also be used to determine if the button pushed at step 510 was likely pushed by a finger. As such, each button of the remote control may include a temperature sensor. Similarly, capacitive sensors may be used to determine if the body of the remote control is in the user's hand and/or if the button pushed was likely pushed by a user. If not, method 500 may proceed to step 580. Biometrics may be evaluated at the remote control. Therefore, if a user is determined to not be present, the command may not be transmitted to the television receiver.

At step 550, it may be determined if the remote control is oriented in an orientation indicative of being held by a user. With respect to gravity, one or more angles of the remote control, such as with respect to the z-axis and the x-axis, as illustrated in FIG. 3B, may be evaluated. Each of these angles may be compared to predefined threshold angles, which may be defined by the television service provider and the user. If one or more of the measured angles determined as part of step 550 are outside the corresponding predefined threshold angle, method 500 may proceed to step 580. In some embodiments, the orientation analysis is performed by the remote control; thus the command may not be transmitted to the television receiver at step 580. The user may be permitted to define the predefined angles. In some embodiments, the user may provide the television receiver with an indication of the one or more viewing positions the user usually watches television in, such as sitting down, lying down, and standing up. The predefined angles may be selected for step 550 based on the user's selected viewing positions.

At step 560, it may be determined if the remote control is pointed in the direction of the television receiver (or an antenna associated with the television receiver). A camera located at the remote control or the television receiver may be used to capture one or more images to determine where the remote control is pointed. A threshold angle, such as detailed in FIG. 3B, may be defined by the television service provider and the user that indicates the angle to the television receiver within which commands will be executed or transmitted.

If none of the steps of method 500 result in step 580 being performed, step 570 may be performed. At step 570, the command associated with the key press of step 510 may be transmitted to the television receiver and/or executed by the television receiver. In some embodiments, rather than one failed step resulting in step 580 being performed, two or more failed steps of method 500 may be required for step 580 to be performed. For instance, the remote control not detecting a biometric presence of the user may not be enough for the command to be ignored, but the biometric presence of the user not being detected and the remote control being outside the predefined orientation limits may result in step 580 being performed. The number of steps which must be failed may be defined by the television service provider and the user.

At step 580, the command associated with the key press of step 510 may be ignored. In some embodiments, a message may be transmitted to the television receiver indicating that the command associated with the key press of step 510 is being ignored and, possibly, with an indication of why. Whether the evaluation of the key press is performed wholly or partly by the remote control or the television receiver, the television receiver, if so configured, may output an auditory or visual indication for display that indicates the command is being ignored, and, possibly, why. In some embodiments, if the same key press is repeated within a predefined period of time, the key press will be transmitted and executed regardless of method 500. This may occur because a repeated key press (within a period of time) is indicative of an intentional key press.

Figure 6:
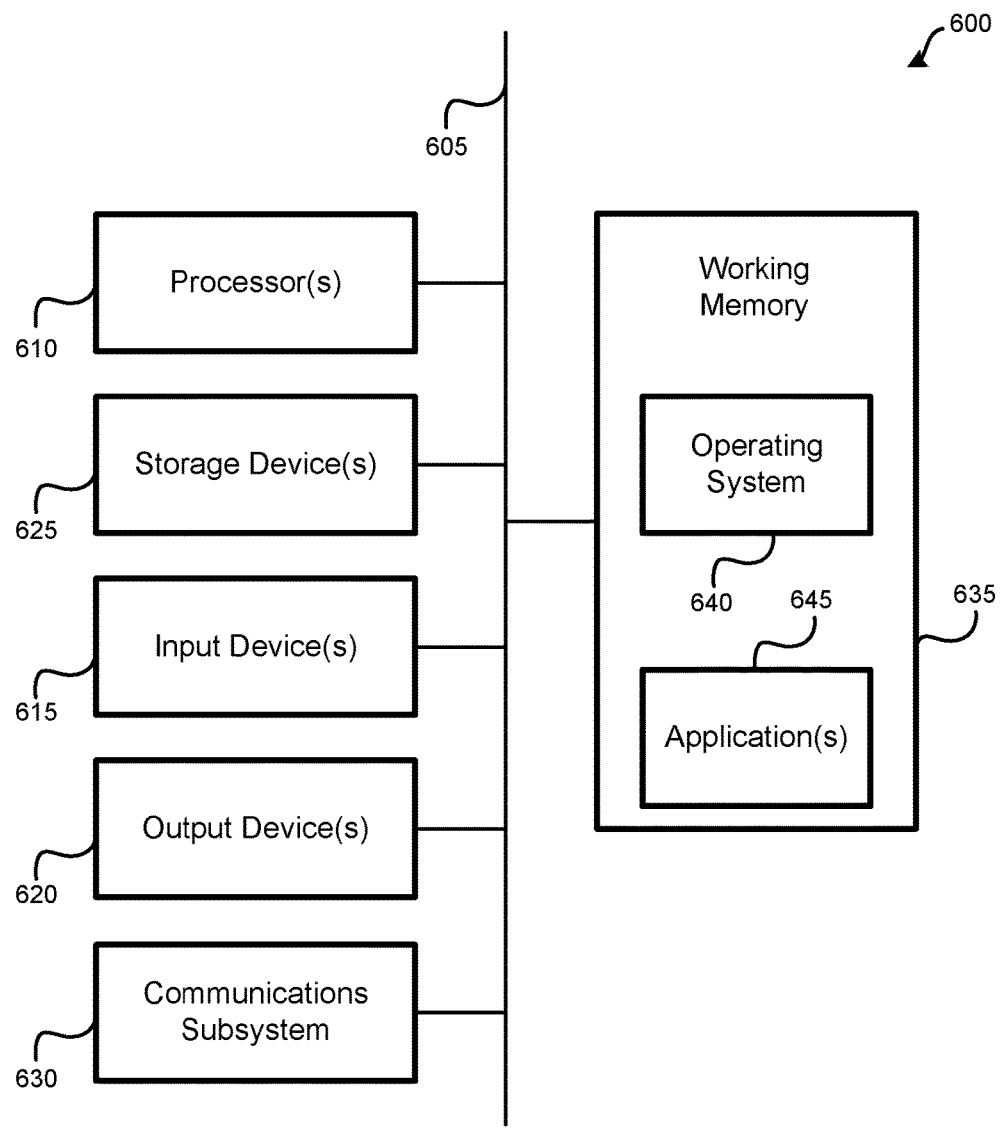
FIG. 6 illustrates an embodiment of a computer system.

FIG. 6 illustrates an embodiment of a computer system. A computer system as illustrated in FIG. 6 may be incorporated as part of the previously described computerized devices, such as the remote controls and television receivers. FIG. 6 provides a schematic illustration of one embodiment of a computer system 600 that can perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, video decoders, and/or the like); one or more input devices 615, which can include without limitation a mouse, a keyboard, remote control, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for ignoring an inadvertent remote control key press, the method comprising:
   detecting, by a remote control, a first key press, the first key press being linked with a first command;
   analyzing, by the remote control, a capacitance or a temperature associated with the first key press;
   measuring, by the remote control, an orientation of the remote control with respect to a direction of gravity;
   comparing, by the remote control, the measured orientation of the remote control with threshold orientation angles;
   determining that the capacitance or the temperature is indicative of the remote control not being held by a user; and
   ignoring the first command based on comparing the measured orientation of the remote control with the threshold orientation angles and determining that the capacitance or the temperature is indicative of the remote control not being held by the user.

2. The method for ignoring the inadvertent remote control key press of claim 1, wherein ignoring the first command comprises a television receiver in communication with the remote control not performing a function associated with the first command.

3. The method for ignoring inadvertent remote control key presses of claim 1, the method further comprising:
   determining, by the remote control, that the remote control is pointed more than a threshold angle away from a television receiver that receives signals from the remote control, wherein:
      ignoring the first command is further based on determining that the remote control is pointed more than the threshold angle away from the television receiver.

4. The method for ignoring the inadvertent remote control key press of claim 1, wherein ignoring the first command based on comparing the measured orientation of the remote control with the threshold orientation angles and determining that the capacitance or the temperature is indicative of the remote control not being held by the user is performed by the remote control.

5. The method for ignoring the inadvertent remote control key press of claim 1, wherein each threshold orientation angle of the threshold orientation angles is indicative of an amount of rotation of the remote control with respect to an axis.

6. The method for ignoring the inadvertent remote control key press of claim 1, wherein the threshold orientation angles are defined by a television service provider.

7. The method for ignoring the inadvertent remote control key press of claim 1, wherein the threshold orientation angles are defined by a user of the remote control.

8. The method for ignoring the inadvertent remote control key press of claim 1, wherein measuring the orientation of the remote control with respect to gravity is performed based on an image captured by the remote control that includes a target.

9. The method for ignoring the inadvertent remote control key press of claim 1, further comprising:
   in response to receiving the first key press, delaying, by the remote control, transmission of the first command.

10. A method for ignoring inadvertent remote control key presses, the method comprising:
    detecting, by a remote control, a first key press and a second key press, the first key press being linked with a first command and the second key press being linked with a second command;
    determining that the first key press and the second key press constitute a key combination based on the first key press and the second key press occurring within a predefined duration of time of each other;
    determining the first key press and the second key press correspond to a predefined unexpected key combination of a stored plurality of unexpected key combinations;
    analyzing, by the remote control, one or more capacitances associated with the first key press, the second key press, or both, and
    ignoring the first command and the second command based on: (1) determining that the first key press and the second key press correspond to the predefined unexpected key combination; (2) the first key press and the second key press occurring within the predefined duration of time of each other; and (3) determining that the one or more capacitances are indicative of the remote control not being held by a user.

11. The method for ignoring inadvertent remote control key presses of claim 10, further comprising:
    in response to receiving the first key press, delaying, by the remote control, transmission of the first command.

12. The method for ignoring inadvertent remote control key presses of claim 10, wherein ignoring the first command and the second command is performed by the remote control.

13. The method for ignoring inadvertent remote control key presses of claim 10, wherein ignoring the first command and the second command is performed by a television receiver.

14. A method for ignoring inadvertent remote control key presses, the method comprising:

detecting, by a remote control, a first key press and a second key press, the first key press being linked with a first command and the second key press being linked with a second command;

determining that the first key press and the second key press constitute a key combination based on the first key press and the second key press occurring within a predefined duration of time of each other;

determining the first key press and the second key press correspond to a predefined unexpected key combination of a stored plurality of unexpected key combinations;

analyzing, by the remote control, a temperature measured in association with the first key press, the second key press, or both; and ignoring the first command and the second command based on: (1) determining that the first key press and the second key press correspond to the predefined unexpected key combination; (2) the first key press and the second key press occurring within the predefined duration of time of each other; and (3) determining that the temperature is indicative of the remote control not being held by a user.

15. The method for ignoring inadvertent remote control key presses of claim 14, further comprising:

in response to receiving the first key press, delaying, by the remote control, transmission of the first command.

16. The method for ignoring inadvertent remote control key presses of claim 14, wherein ignoring the first command and the second command is performed by the remote control.

17. The method for ignoring inadvertent remote control key presses of claim 14, wherein ignoring the first command and the second command is performed by a television receiver.

* * * * *